(12) United States Patent
Aulick

(10) Patent No.: US 6,688,834 B1
(45) Date of Patent: Feb. 10, 2004

(54) SELF-CONTAINED HYDRAULIC POWER UNIT

(76) Inventor: Vinc L. Aulick, 730 Ave. "I", Scottsbluff, NE (US) 69361

(*) Notice: Subject to any disclaimer, the term of this patent is extended or adjusted under 35 U.S.C. 154(b) by 157 days.

(21) Appl. No.: 09/552,063

(22) Filed: Apr. 19, 2000

(51) Int. Cl.[7] ................ B60P 1/16; B60P 1/42
(52) U.S. Cl. .............. 414/469; 414/482; 414/485; 414/526; 417/229; 60/413
(58) Field of Search ................. 414/469, 482, 414/485, 526

(56) References Cited

U.S. PATENT DOCUMENTS

| | | | | |
|---|---|---|---|---|
| 3,834,767 A | * | 9/1974 | Bullinger | 303/7 |
| 3,866,935 A | * | 2/1975 | Nelson | 280/42.23 |
| 4,030,751 A | * | 6/1977 | Bobka | 414/469 X |
| 4,141,582 A | * | 2/1979 | Streeter | 296/50 |
| 4,351,377 A | * | 9/1982 | Hamel | 144/195.1 |
| 4,621,972 A | * | 11/1986 | Grotte | 414/477 |
| 5,112,182 A | * | 5/1992 | Nuttall | 414/481 |
| 5,320,058 A | * | 6/1994 | Reed | 114/344 |
| 5,409,344 A | * | 4/1995 | Tharaldson | 414/526 X |
| 5,499,694 A | * | 3/1996 | Dorn | 187/200 |
| 5,551,796 A | * | 9/1996 | Anderson, Jr. et al. | 404/6 |
| 5,687,567 A | * | 11/1997 | Hansson et al. | 60/413 |
| 5,839,568 A | * | 11/1998 | Clark | 198/750.5 |

* cited by examiner

*Primary Examiner*—Steven A. Bratlie
(74) *Attorney, Agent, or Firm*—Thomte, Mazour & Niebergall; Dennis L. Thomte

(57) ABSTRACT

A self-contained hydraulic power unit is described for powering a hydraulic actuator such as a hydraulic cylinder or a hydraulic motor positioned on a grain trailer or the like. A battery operated hydraulic pump pressurizes a hydraulic accumulator so that when needed, hydraulic fluid can be supplied from the pressurized hydraulic accumulator to a valve which in turn is connected to a hydraulic actuator or actuators.

18 Claims, 3 Drawing Sheets

SELF-CONTAINED HYDRAULIC POWER UNIT

BACKGROUND OF THE INVENTION

1. Field of the Invention

This invention relates to a self-contained hydraulic power unit and more particularly to a power unit which does not require hydraulic power supplied from an external power source. More particularly, this invention relates to a self-contained hydraulic power unit that may be utilized on a grain trailer or the like to power the lift cylinder on the dump unit, power the conveyer, power the hydraulic floor, or power the end gate.

2. Description of the Related Art

Trailers or the like are frequently used to transport grain or other commodities from one location to another. Frequently, the trailers include a lift cylinder to enable the body to be pivotally moved from a non-dumping position to a dumping position. Further, the trailer or the like may have a conveyor or hydraulic floor associated therewith. Additionally, in some instances, the end gate for the trailer is powered by a hydraulic actuator such as a hydraulic cylinder or hydraulic motor. Inasmuch as the trailers do not normally have a power source, it is necessary that the tractor or truck pulling the trailer have a PTO and hydraulic system with a reservoir to power the hydraulically operated components on the trailer. Many times, the tractors and trucks do not have PTO's thereon. Other systems on the market utilize a small gas or diesel engine to pump oil to the hydraulic actuators. Further, some systems utilize electric over hydraulic systems. These electric systems plug into an electrical source to power the hydraulic actuators such as hydraulic cylinders or hydraulic motors. Such systems are expensive.

SUMMARY OF THE INVENTION

A self-contained hydraulic power unit is disclosed for powering one or more hydraulic actuators such as hydraulic cylinders or hydraulic motors. The power unit of this invention is ideally suited for use on a grain trailer or the like including a hydraulic cylinder for raising and lowering the dump body, a hydraulic actuator for raising or lowering the end gate of the trailer, a hydraulic actuator for operating a conveyor on the trailer, or a hydraulic actuator for operating the hydraulic floor of the trailer. The power unit comprises a hydraulic pump having inlet and discharge sides; a valve means having inlet, outlet, and return sides; a hydraulic reservoir having inlet and outlet sides; the inlet side of the hydraulic reservoir being fluidly connected to the return side of the valve means; the outlet side of the hydraulic reservoir being fluidly connected to the inlet side of the hydraulic pump; a hydraulic accumulator having an inlet/outlet port; the discharge side of the hydraulic pump being fluidly connected to the inlet/outlet port on the accumulator for accumulating hydraulic fluid under pressure within the accumulator; the inlet/outlet port of the accumulator being fluidly connected to the inlet side of the valve means for supplying hydraulic fluid under pressure to the valve means; and the outlet side of the valve means being fluidly connected to the hydraulic actuator whereby the valve means may be operated to provide pressurized hydraulic fluid from the accumulator to the hydraulic actuator to operate the same. In one embodiment of the invention, the hydraulic pump is battery operated. In another embodiment, the hydraulic pump is wheel driven by a wheel on the trailer as the trailer is moved from one location to another.

It is therefore a principal object of the invention to provide a self-contained hydraulic power unit for powering a hydraulic actuator such as a hydraulic cylinder or hydraulic motor.

Still another object of the invention is to provide a self-contained power unit which may be mounted on a trailer or the like for powering the hydraulic components thereon.

Still another object of the invention is to provide a self-contained hydraulic power unit which may be either battery driven or wheel driven.

These and other objects of the invention will be apparent to those skilled in the art.

DESCRIPTION OF THE PREFERRED EMBODIMENT

Figure 1:
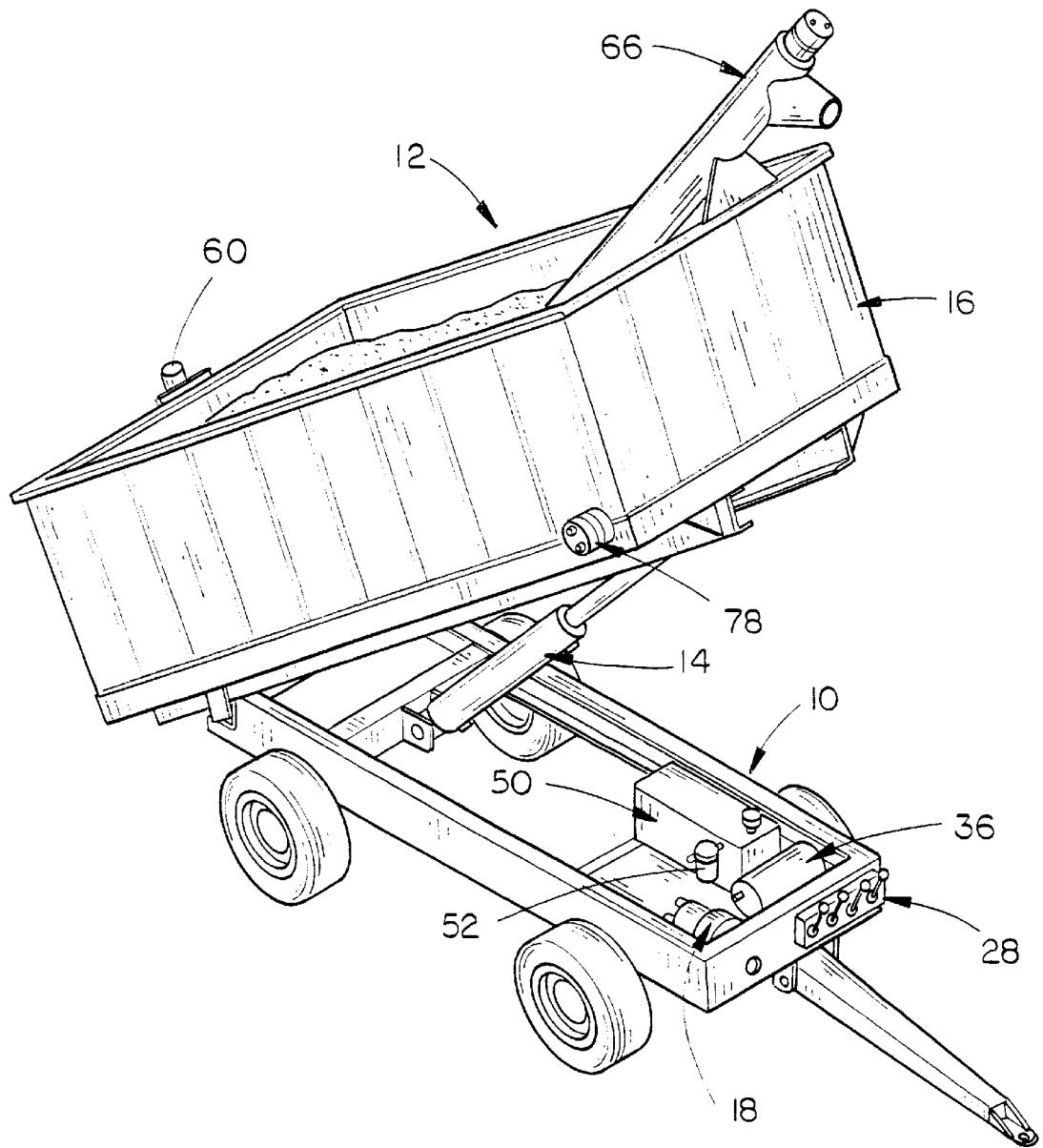
FIG. 1 is a perspective view illustrating a trailer having the self-contained hydraulic power unit of this invention mounted thereon.

The self-contained hydraulic power unit of this invention is referred to generally by the reference numeral 10. The power unit of this invention is ideally suited for use on a grain trailer or the like which is generally referred to by the reference numeral 12. Trailer 12 is shown to include a hydraulic cylinder 14 for raising and lowering the body 16 of the trailer 12 between its non-dumping position and its dumping position.

Figure 2A:
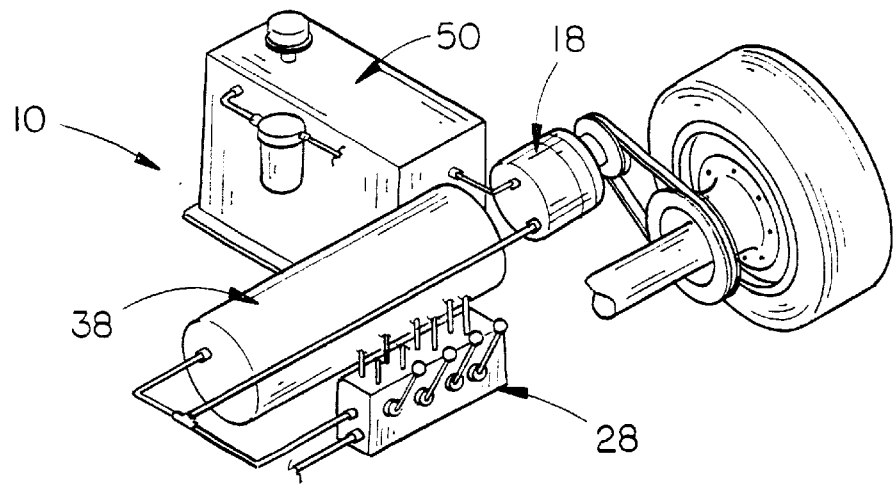
FIG. 2A is a perspective view illustrating the hydraulic power unit being wheel driven.
Figure 2B:
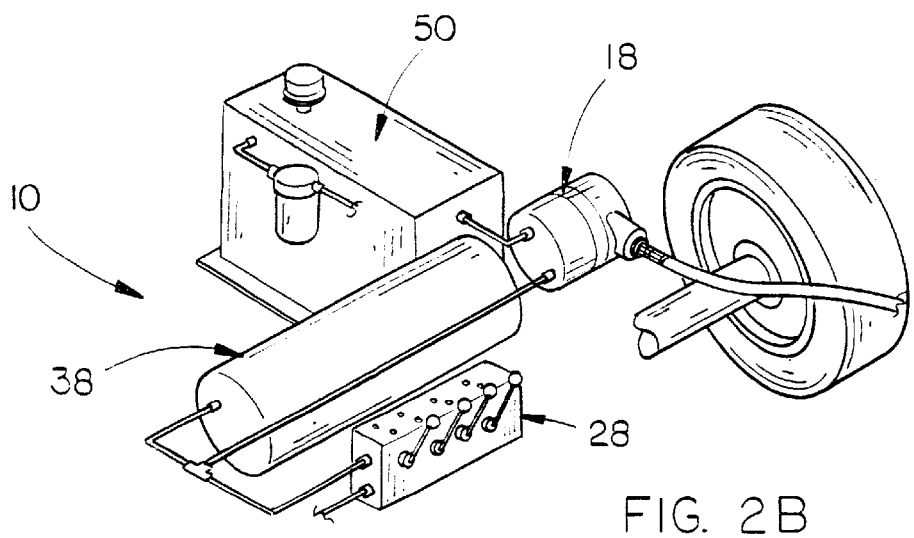
FIG. 2B is a perspective view illustrating the hydraulic power unit being electrically driven.
Figure 3:
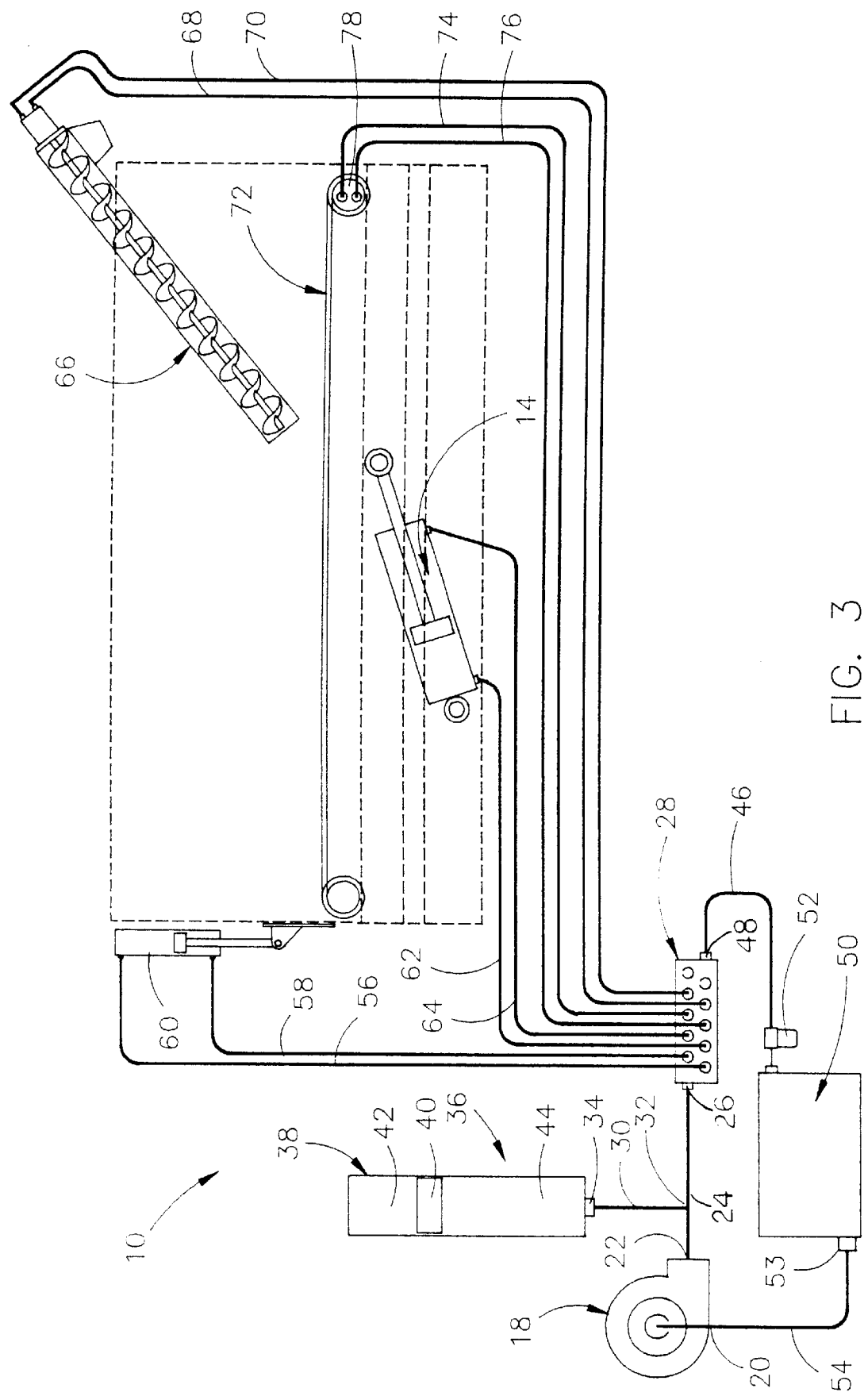
FIG. 3 is a schematic view illustrating the circuitry of this invention.

Hydraulic power unit 10 includes a hydraulic pump 18 having an inlet side 20 and a discharge side 22. The hydraulic pump may be either battery operated (12 VDC), as seen in FIG. 2B, or wheel driven by one of the wheels of the trailer (FIG. 2A) as the trailer is being moved from one location to another. A hydraulic line or conduit 24 extends from the discharge side of pump 18 to the inlet side 26 of a valve 28. Fluid conduit 30 is connected to line 24 at 32 and is connected to the inlet/outlet port 34 of a hydraulic accumulator referred to generally by the reference numeral 36. Accumulator 36 includes a body 38 having a piston 40 longitudinally movably mounted thereon with nitrogen gas or the like being positioned at one side of the piston 40 with the other side of the piston 40 being exposed to the hydraulic fluid in the accumulator 36. For purposes of description, the piston will be described as defining compartment or chambers 42 and 44 on opposite sides of the piston 40.

Hydraulic conduit or line 46 extends from the return side 48 of valve means 28 to a hydraulic reservoir tank 50. Preferably, filter 52 is imposed in line 46. The outlet side 53 of reservoir 50 is connected to the inlet side of pump 18 by means of conduit or line 54. Hydraulic lines or conduits 56 and 58 extend from the outlet side of valve 28 to a hydraulic actuator such as a hydraulic cylinder 60. In the example shown, the hydraulic cylinder 60 is used to vertically move the end gate in the body 16. Hydraulic lines or conduits 62 and 64 also extend from the outlet side of valve 28 to hydraulic cylinder 14, for raising and lowering the body 16. If there is a conveyor 66 on the trailer, lines 68 and 70 would be extended from the valve 28 to the hydraulic actuator therefore. Further, if a hydraulic (line) floor 72 or the like is utilized on the trailer, a pair of conduits 74 and 76 would be extended from the valve 28 to the hydraulic actuator 78 therefore. The valve 28 is selectively operated to control the hydraulic actuators connected thereto.

In operation, assuming that the hydraulic pump 22 is battery driven, actuation of the pump 18 causes hydraulic fluid to be introduced into chamber 44 of accumulator 38. As the hydraulic fluid is introduced into chamber 44, the piston 40 moves longitudinally in the body 38 to compress the gas in compartment 42. Preferably, the accumulator has approximately a 45-gallon capacity. When the accumulator has been sufficiently charged, valve 28 will be operated to control the various hydraulic actuators. The hydraulic actuators will be operated at a high rate of speed because the stored hydraulic pressure in the accumulator 36 can be discharged quickly. Hydraulic oil pressure within the accumulator 36 will then be replenished over time by the on-board hydraulic pump 18 while the trailer is going after the next load of grain. If the hydraulic pump 18 is wheel driven, one of the wheels of the trailer would operate the pump as the trailer goes after another load.

Thus it can be seen that a novel self-contained hydraulic power unit has been provided which is ideally suited for powering the hydraulic actuators on a grain trailer or the like. While the self-controlled power unit is ideally suited for use on a grain trailer or the like, it is conceivable that it could be used on other types of equipment as well.

Thus it can be seen that the invention accomplishes at least all of its stated objectives.

I claim:

1. A self-contained hydraulic power unit for powering a hydraulic actuator such as a hydraulic cylinder or the like, comprising:

a hydraulic pump having inlet and discharge sides;

a valve means having inlet, outlet and return sides;

a hydraulic reservoir having inlet and outlet sides;

said inlet side of said hydraulic reservoir being fluidly connected to said return side of said valve means;

said outlet side of said hydraulic reservoir being fluidly connected to said inlet side of said hydraulic pump;

a hydraulic accumulator having an inlet/outlet port;

said discharge side of said hydraulic pump being fluidly connected to said inlet/outlet port on said accumulator for accumulating hydraulic fluid under pressure within said accumulator;

said inlet/outlet port of said accumulator being fluidly connected to said inlet side of said valve means for supplying hydraulic fluid under pressure to said valve means;

said outlet side of said valve means being fluidly connected to the hydraulic actuator whereby said valve means may be operated to provide pressurized hydraulic fluid from said accumulator to the hydraulic actuator to operate the same;

said hydraulic pump being battery operated.

2. A self-contained hydraulic power unit for powering a hydraulic actuator such as a hydraulic cylinder or the like, comprising:

a hydraulic pump having inlet and discharge sides;

a valve means having inlet, outlet and return sides;

a hydraulic reservoir having inlet and outlet sides;

said inlet side of said hydraulic reservoir being fluidly connected to said return side of said valve means;

said outlet side of said hydraulic reservoir being fluidly connected to said inlet side of said hydraulic pump;

a hydraulic accumulator having an inlet/outlet port;

said discharge side of said hydraulic pump being fluidly connected to said inlet/outlet port on said accumulator for accumulating hydraulic fluid under pressure within said accumulator;

said inlet/outlet port of said accumulator being fluidly connected to said inlet side of said valve means for supplying hydraulic fluid under pressure to said valve means;

said outlet side of said valve means being fluidly connected to the hydraulic actuator whereby said valve means may be operated to provide pressurized hydraulic fluid from said accumulator to the hydraulic actuator to operate the same;

said power unit being mounted on a wheeled frame and wherein the hydraulic pump is wheel driven to pressurize the said accumulator as said wheeled frame moves from one location to another.

3. A self-contained hydraulic power unit for powering a hydraulic actuator such as a hydraulic cylinder or the like, comprising:

a hydraulic pump having inlet and discharge sides;

a valve means having inlet, outlet and return sides;

a hydraulic reservoir having inlet and outlet sides;

said inlet side of said hydraulic reservoir being fluidly connected to said return side of said valve means;

said outlet side of said hydraulic reservoir being fluidly connected to said inlet side of said hydraulic pump;

a hydraulic accumulator having an inlet/outlet port;

said discharge side of said hydraulic pump being fluidly connected to said inlet/outlet port on said accumulator for accumulating hydraulic fluid under pressure within said accumulator;

said inlet/outlet port of said accumulator being fluidly connected to said inlet side of said valve means for supplying hydraulic fluid under pressure to said valve means;

said outlet side of said valve means being fluidly connected to the hydraulic actuator whereby said valve means may be operated to provide pressurized hydraulic fluid from said accumulator to the hydraulic actuator to operate the same;

said power unit being mounted on a trailer having an end gate and wherein said end gate is movable between open and closed positions by the hydraulic actuator.

4. A self-contained hydraulic power unit for powering a hydraulic actuator such as a hydraulic cylinder or the like, comprising:

a hydraulic pump having inlet and discharge sides;

a valve means having inlet, outlet and return sides;

a hydraulic reservoir having inlet and outlet sides;

said inlet side of said hydraulic reservoir being fluidly connected to said return side of said valve means;

said outlet side of said hydraulic reservoir being fluidly connected to said inlet side of said hydraulic pump;

a hydraulic accumulator having an inlet/outlet port;

said discharge side of said hydraulic pump being fluidly connected to said inlet/outlet port on said accumulator for accumulating hydraulic fluid under pressure within said accumulator;

said inlet/outlet port of said accumulator being fluidly connected to said inlet side of said valve means for supplying hydraulic fluid under pressure to said valve means;

said outlet side of said valve means being fluidly connected to the hydraulic actuator whereby said valve means may be operated to provide pressurized hydraulic fluid from said accumulator to the hydraulic actuator to operate the same;

said power unit being mounted on a trailer having a pivotal body which is movable between non-dumping and dumping positions by the hydraulic cylinder.

5. A self-contained hydraulic power unit for powering a hydraulic actuator such as a hydraulic cylinder or the like, comprising:

a hydraulic pump having inlet and discharge sides;

a valve means having inlet, outlet and return sides;

a hydraulic reservoir having inlet and outlet sides;

said inlet side of said hydraulic reservoir being fluidly connected to said return side of said valve means;

said outlet side of said hydraulic reservoir being fluidly connected to said inlet side of said hydraulic pump;

a hydraulic accumulator having an inlet/outlet port;

said discharge side of said hydraulic pump being fluidly connected to said inlet/outlet port on said accumulator for accumulating hydraulic fluid under pressure within said accumulator;

said inlet/outlet port of said accumulator being fluidly connected to said inlet side of said valve means for supplying hydraulic fluid under pressure to said valve means;

said outlet side of said valve means being fluidly connected to the hydraulic actuator whereby said valve means may be operated to provide pressurized hydraulic fluid from said accumulator to the hydraulic actuator to operate the same;

said power unit being mounted on a trailer having a conveyor and wherein said conveyor is operated by a hydraulic actuator.

6. A self-contained hydraulic power unit for powering a hydraulic actuator such as a hydraulic cylinder or the like, comprising:

a hydraulic pump having inlet and discharge sides;

a valve means having inlet, outlet and return sides;

a hydraulic reservoir having inlet and outlet sides;

said inlet side of said hydraulic reservoir being fluidly connected to said return side of said valve means;

said outlet side of said hydraulic reservoir being fluidly connected to said inlet side of said hydraulic pump;

a hydraulic accumulator having an inlet/outlet port;

said discharge side of said hydraulic pump being fluidly connected to said inlet/outlet port on said accumulator for accumulating hydraulic fluid under pressure within said accumulator;

said inlet/outlet port of said accumulator being fluidly connected to said inlet side of said valve means for supplying hydraulic fluid under pressure to said valve means;

said outlet side of said valve means being fluidly connected to the hydraulic actuator whereby said valve means may be operated to provide pressurized hydraulic fluid from said accumulator to the hydraulic actuator to operate the same;

the power unit being mounted on a trailer having a hydraulically operated floor which is operated by the hydraulic actuator.

7. In combination:

a wheeled trailer having a body movably mounted therein which is movable between non-dumping and dumping positions;

a hydraulic cylinder connected to said body for pivotally moving said body from its non-dumping position to its dumping position;

a self-contained power unit on said trailer for powering said hydraulic cylinder;

said power unit comprising a hydraulic pump having inlet and discharge sides; a valve means having inlet, outlet and return sides; a hydraulic reservoir having inlet and outlet sides; said inlet side of said hydraulic reservoir being fluidly connected to said return side of said valve means; said outlet side of said hydraulic reservoir being fluidly connected to said inlet side of said hydraulic pump; a hydraulic accumulator having an inlet/outlet port; said discharge side of said hydraulic pump being fluidly connected to said inlet/outlet port on said accumulator for accumulating hydraulic fluid under pressure within said accumulator; said inlet/outlet port of said accumulator being fluidly connected to said inlet side of said valve means for supplying hydraulic fluid under pressure to said valve means; said outlet side of said valve means being fluidly connected to the hydraulic cylinder whereby said valve means may be operated to provide pressurized hydraulic fluid from said accumulator to said hydraulic cylinder to operate the same.

8. The combination of claim 7 wherein said hydraulic pump is battery operated.

9. The combination of claim 7 herein said hydraulic pump is wheel driven to pressurize said accumulator as said trailer is moved from one location to another.

10. In combination:

a wheeled trailer having a body thereon which has a movable end gate movable between open and closed positions;

a hydraulic actuator connected to said end gate for moving said end gate between its open and closed positions;

a self-contained power unit for powering said hydraulic actuator;

said power unit comprising a hydraulic pump having inlet and discharge sides; a valve means having inlet, outlet and return sides; a hydraulic reservoir having inlet and outlet sides; said inlet side of said hydraulic reservoir being fluidly connected to said return side of said valve means; said outlet side of said hydraulic reservoir being fluidly connected to said inlet side of said hydraulic pump; a hydraulic accumulator having an inlet/outlet port; said discharge side of said hydraulic pump being fluidly connected to said inlet/outlet port on said accumulator for accumulating hydraulic fluid under pressure within said accumulator; said inlet/outlet port of said accumulator being fluidly connected to said inlet side of said valve means for supplying hydraulic fluid under pressure to said valve means; said outlet side of said valve means being fluidly connected to the hydraulic actuator whereby said valve means may be operated to provide pressurized hydraulic fluid from said accumulator to said hydraulic actuator to operate the same.

11. The combination of claim 10 wherein said hydraulic pump is battery operated.

12. The combination of claim 10 wherein said hydraulic pump is wheel driven to pressurize said accumulator as said trailer is moved from one location to another.

13. In combination:

a wheeled trailer having a conveyor thereon;

a hydraulic actuator connected to said conveyor for actuating the same;

a wheeled trailer having a body movably mounted therein which is movable between non-dumping and dumping positions;

a hydraulic actuator connected to said body for pivotally moving said body from its non-dumping position to its dumping position;

a self-contained power unit for powering said hydraulic actuator;

said power unit comprising a hydraulic pump having inlet and discharge sides; a valve means having inlet, outlet and return sides; a hydraulic reservoir having inlet and outlet sides; said inlet side of said hydraulic reservoir being fluidly connected to said return side of said valve means; said outlet side of said hydraulic reservoir being fluidly connected to said inlet side of said hydraulic pump; a hydraulic accumulator having an inlet/outlet port; said discharge side of said hydraulic pump being fluidly connected to said inlet/outlet port on said accumulator for accumulating hydraulic fluid under pressure within said accumulator; said inlet/outlet port of said accumulator being fluidly connected to said inlet side of said valve means for supplying hydraulic fluid under pressure to said valve means; said outlet side of said valve means being fluidly connected to the hydraulic actuator whereby said valve means may be operated to provide pressurized hydraulic fluid from said accumulator to said hydraulic actuator to operate the same.

14. The combination of claim 13 wherein said hydraulic pump is battery operated.

15. The combination of claim 13 wherein said hydraulic pump is wheel driven to pressurize said accumulator as said trailer is moved from one location to another.

16. In combination:

a wheeled trailer having a hydraulically operated floor;

a hydraulic actuator connected to said floor for operating the same;

a wheeled trailer having a body movably mounted therein which is movable between non-dumping and dumping positions;

a hydraulic actuator connected to said body for pivotally moving said body from its non-dumping position to its dumping position;

a self-contained power unit for powering said hydraulic actuator;

said power unit comprising a hydraulic pump having inlet and discharge sides; a valve means having inlet, outlet and return sides; a hydraulic reservoir having inlet and outlet sides; said inlet side of said hydraulic reservoir being fluidly connected to said return side of said valve means; said outlet side of said hydraulic reservoir being fluidly connected to said inlet side of said hydraulic pump; a hydraulic accumulator having an inlet/outlet port; said discharge side of said hydraulic pump being fluidly connected to said inlet/outlet port on said accumulator for accumulating hydraulic fluid under pressure within said accumulator; said inlet/outlet port of said accumulator being fluidly connected to said inlet side of said valve means for supplying hydraulic fluid under pressure to said valve means; said outlet side of said valve means being fluidly connected to the hydraulic actuator whereby said valve means may be operated to provide pressurized hydraulic fluid from said accumulator to said hydraulic actuator to operate the same.

17. The combination of claim 16 wherein said hydraulic pump is battery operated.

18. The combination of claim 16 wherein said hydraulic pump is wheel driven to pressurize said accumulator as said trailer is moved from one location to another.

* * * * *